(12) United States Patent
Desai et al.

(10) Patent No.: US 8,849,262 B2
(45) Date of Patent: Sep. 30, 2014

(54) DISCLOSURE OF COMMUNICATION INFORMATION

(75) Inventors: Kushang Desai, San Diego, CA (US); Shailesh Maheshwari, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 681 days.

(21) Appl. No.: 12/324,660

(22) Filed: Nov. 26, 2008

(65) Prior Publication Data

US 2010/0130185 A1 May 27, 2010

(51) Int. Cl.
*H04M 3/42* (2006.01)
*H04M 15/30* (2006.01)
*H04W 4/24* (2009.01)
*H04M 15/06* (2006.01)
*H04M 15/28* (2006.01)
*H04M 11/00* (2006.01)
*H04W 4/00* (2009.01)
*H04W 40/00* (2009.01)
*H04M 15/00* (2006.01)
*H04M 1/64* (2006.01)
*H04M 1/57* (2006.01)

(52) U.S. Cl.
CPC .......... *H04M 15/00* (2013.01); *H04M 15/8083* (2013.01); *H04M 2215/8108* (2013.01); *H04M 15/844* (2013.01); *H04M 15/58* (2013.01); *H04M 15/85* (2013.01); *H04M 2215/0104* (2013.01); *H04M 2215/0192* (2013.01); *H04M 2215/8104* (2013.01); *H04N 15/44* (2013.01); *H04M 2215/815* (2013.01); *H04M 2215/0152* (2013.01); *H04M 2215/8129* (2013.01); *H04M 15/30* (2013.01); *H04M 2215/82* (2013.01); *H04M 15/835* (2013.01); *H04M 2215/54* (2013.01); *H04M 15/84* (2013.01); *H04W 4/24* (2013.01); *H04M 2215/46* (2013.01); *H04M 15/49* (2013.01); *H04M 15/851* (2013.01); *H04M 15/80* (2013.01); *H04M 15/51* (2013.01); *H04M 1/57* (2013.01); *H04M 2215/92* (2013.01); *H04M 2215/0188* (2013.01); *H04M 3/42042* (2013.01); *H04M 2215/0184* (2013.01); *H04M 2215/81* (2013.01); *H04M 2215/8137* (2013.01); *H04M 15/8351* (2013.01); *H04M 15/06* (2013.01); *H04M 15/28* (2013.01); *H04M 2215/8183* (2013.01); *H04M 2215/2026* (2013.01); *H04M 15/83* (2013.01); *H04M 15/858* (2013.01)
USPC ........ 455/415; 455/435.2; 455/405; 455/445; 455/466; 379/114.03; 379/88.19; 379/52; 379/142.01

(58) Field of Classification Search
USPC ....................................................... 455/415
See application file for complete search history.

(56) References Cited

U.S. PATENT DOCUMENTS

| | | |
|---|---|---|
| 5,351,289 A | 9/1994 | Logsdon et al. |
| 6,208,719 B1 | 3/2001 | Lo et al. |
| 6,259,780 B1 | 7/2001 | Sherwood et al. |
| 6,941,134 B2 | 9/2005 | White |
| 7,502,450 B2 | 3/2009 | Sakai et al. |
| 7,668,507 B2 | 2/2010 | Ramsten et al. |
| 8,019,330 B2 | 9/2011 | Phillips et al. |
| 2003/0054864 A1 | 3/2003 | Mergler |
| 2004/0052341 A1 | 3/2004 | Yeh et al. |
| 2004/0077380 A1* | 4/2004 | Park ............................. 455/566 |
| 2004/0151287 A1* | 8/2004 | Bedner ...................... 379/88.19 |
| 2004/0203744 A1 | 10/2004 | Hicks et al. |
| 2006/0234703 A1* | 10/2006 | Wuthnow et al. ............. 455/433 |
| 2006/0258329 A1* | 11/2006 | Gruchala et al. .............. 455/405 |
| 2007/0015507 A1* | 1/2007 | Petronelli .................. 455/435.2 |
| 2007/0111714 A1* | 5/2007 | Edwards ....................... 455/415 |
| 2007/0135128 A1 | 6/2007 | Villa et al. |
| 2008/0059642 A1* | 3/2008 | Bhogal et al. ................. 709/229 |
| 2008/0102805 A1* | 5/2008 | Balia et al. .................... 455/415 |
| 2008/0182552 A1* | 7/2008 | Dinh et al. .................... 455/408 |
| 2008/0187108 A1* | 8/2008 | Engelke et al. ................. 379/52 |
| 2009/0215486 A1 | 8/2009 | Batni et al. |
| 2009/0318120 A1 | 12/2009 | Okuyama |
| 2011/0124354 A1 | 5/2011 | Nagata |
| 2011/0317592 A1 | 12/2011 | Maheshwari et al. |

FOREIGN PATENT DOCUMENTS

| | | |
|---|---|---|
| CN | 1537381 A | 10/2004 |
| CN | 101155365 A | 4/2008 |
| JP | 2002152829 A | 5/2002 |
| JP | 2004072165 A | 3/2004 |
| JP | 2004236214 A | 8/2004 |
| JP | 2005012432 A | 1/2005 |
| JP | 2006121512 A | 5/2006 |
| JP | 2010034928 A | 2/2010 |
| KR | 20070025816 | 3/2007 |
| WO | WO-2004019638 A2 | 3/2004 |
| WO | WO2008026049 A2 | 3/2008 |

OTHER PUBLICATIONS

International Search Report & Written Opinion—PCT/US2009/065968, International Search Authority—European Patent Office—May 25, 2010.

* cited by examiner

*Primary Examiner* — Timothy Pham

(74) *Attorney, Agent, or Firm* — Kevin T. Cheatham

(57) ABSTRACT

A user can have a contract with a mobile communication provider such that a limited number of communication minutes can be used overall or a limited number of minutes can be used with other providers. When incoming call identification information is disclosed, additional information can be presented relating to the contract, such as what provider the incoming call uses and how many free minutes the user has with an incoming provider. The user, in determining if the incoming communication should be engaged, can employ the additional information and make an appropriate decision.

52 Claims, 14 Drawing Sheets

DISCLOSURE OF COMMUNICATION INFORMATION

BACKGROUND

1. Field

The following description relates generally to wireless communications and, more particularly, to managing communication services, commonly in conjunction with a mobile device.

2. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

An individual can purchase a mobile device from a provider where the provider enables the user to engage in communication with other entities. The individual can agree to use the provider for a set length of time and the provider can agree to supply communication capabilities. There can be various penalties associated with the agreement, such as an early termination fee.

An agent of the provider and the individual can enter a usage agreement with specific terms related to use of the mobile device. In the usage agreement, terms can relate to a number of overall communication minutes that can be used by the individual, a number of calls that can be engaged in by the individual, and the like. As part of the agreement or in a separate contract, there can be a transfer of a mobile device to the individual.

Moreover, the usage agreement can include specific parameters that relate to the provider. For example, the provider can include a separate number of free minutes for when the individual engages in a call with another mobile device of the provider. If the mobile device more minutes than offered by the provider, then the individual can incur an additional charge or the mobile device can cease operation.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one aspect, there can be a method for disclosing communication metadata. The method can include determining a provider classification of an incoming communication. In addition, the method can include disclosing the provider classification.

In another aspect, there can be an apparatus with an evaluator that determines a provider classification of an incoming communication. The apparatus can also include a supplier that discloses the provider classification.

With a further aspect, there can be at least one processor configured to disclose communication metadata. The processor can include a first module for determining a provider classification of an incoming communication as well as a second module for disclosing the provider classification.

In yet another aspect, there can be a computer program product with a computer-readable medium. The medium can include a first set of codes for causing a computer to appreciate a provider classification of an incoming communication. Moreover, the medium can include a second set of codes for causing the computer to disclose the provider classification.

With an additional aspect, there can be an apparatus with means for appreciating a provider classification of an incoming communication. The apparatus can also include means for disclosing the provider classification.

According to one aspect, there can be a method for communication regulation. The method can include collecting metadata related to usage of a mobile device in relation to an incoming communication. The method can also include disclosing at least a portion of the collected metadata.

In another aspect, there can be an apparatus with a gatherer that collects metadata related to usage of a mobile device in relation to an incoming communication. The apparatus can also include a presenter that discloses at least a portion of the collected metadata.

With a further aspect, there can be at least one processor configured for communication regulation. The processor can include a first module for collecting metadata related to usage of a mobile device in relation to an incoming communication. In addition, the processor can incorporate a second module for disclosing at least a portion of the collected metadata.

In yet another aspect, there can be a computer program product with a computer-readable medium. The medium can include a first set of codes for causing a computer to collect metadata related to usage of a mobile device in relation to an incoming communication. The medium can also include a second set of codes for causing the computer to disclose at least a portion of the collected metadata.

With an additional aspect, there can be an apparatus with means for collecting metadata related to usage of a mobile device in relation to an incoming communication. The apparatus can also include means for disclosing at least a portion of the collected metadata.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

DETAILED DESCRIPTION

Figure 1:
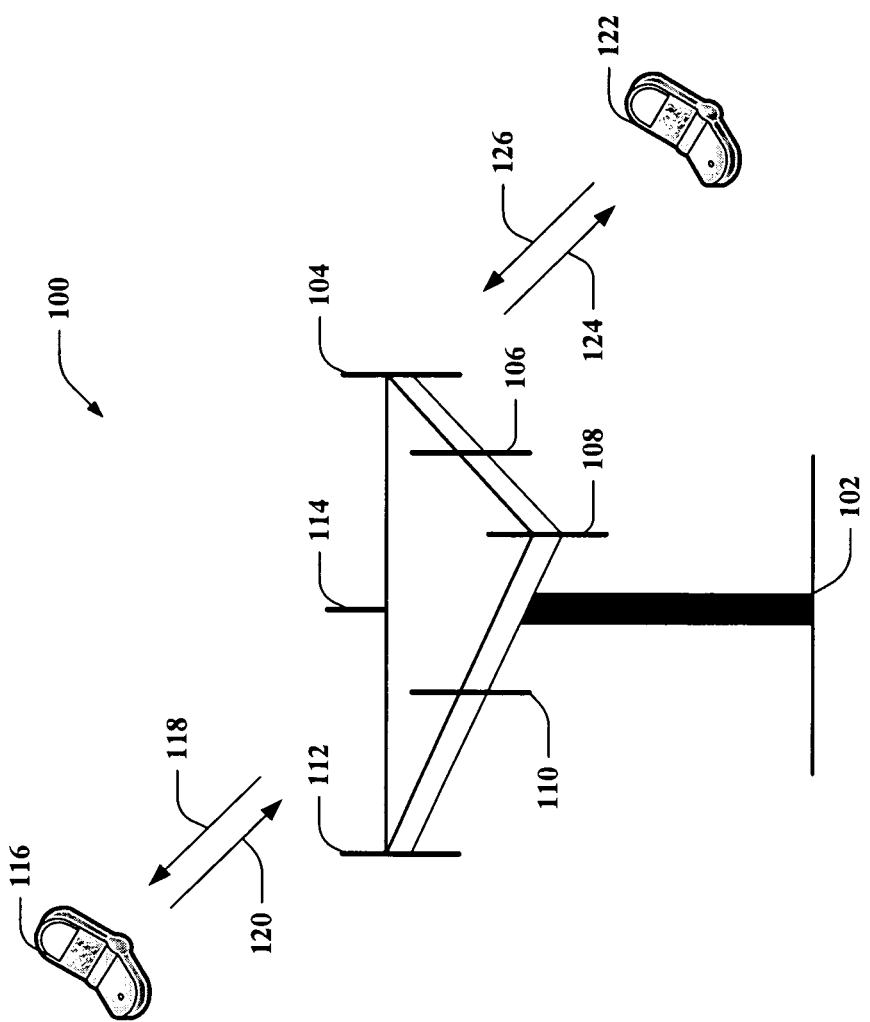
FIG. 1 is an illustration of a wireless communication system in accordance with various aspects set forth herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more embodiments.

As used in this application, the terms "component," "module," "system" and the like are intended to include a computer-related entity, such as but not limited to hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal can be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station can be utilized for communicating with wireless terminal(s) and can also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

The techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. Metadata pertaining to an incoming communication (e.g., cellular call) can be displayed upon the mobile device. For instance, a number of minutes remaining on a 'pay as you go' telephone can be presented to a user.

As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
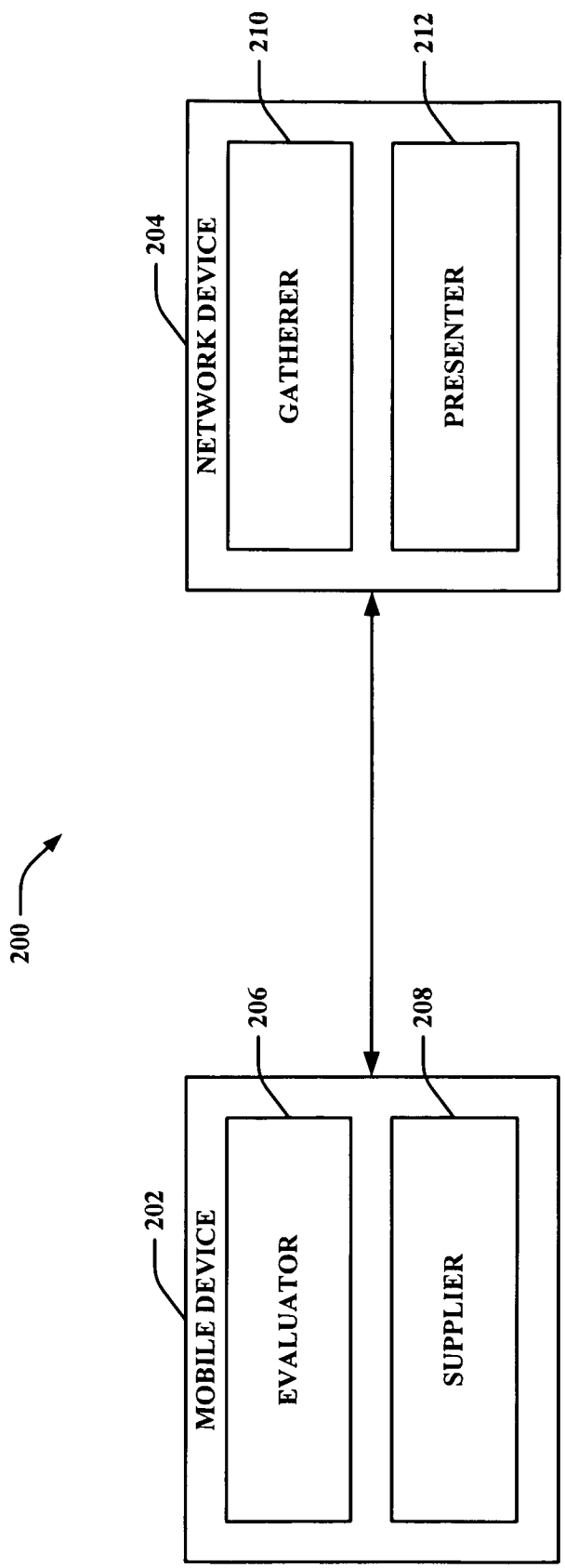
FIG. 2 is an illustration of an example system for disclosure of a provider classification in accordance with at least one aspect.

Now referring to FIG. 2, an example system 200 is disclosed for providing information to a user pertaining to an incoming communication (e.g., cellular telephone call) regarding a mobile device 202. In a conventional setting, an individual engages user equipment (e.g., the mobile device 202) that is contracted to a service provider. As part of a contract, the individual is commonly provided with a number of minutes that can be used, a list of callers that can be provided unlimited minutes (e.g., people in a user designated group, other individuals contracted to the service provider, etc.), and the like. If a user or mobile device 202 engages beyond the established limitation, then service can be terminated or an extra fee can be incurred.

It can be beneficial to notify a user of a relation an incoming call has with a usage contract. For example, the user can be notified of a number of minute remaining, what service provider is used by the caller, a fee that is incurred by accepting a communication, and the like—the notification can occur through a LCD (liquid crystal display) of the mobile device 202, implemented as an audio presentation, and so forth. According to one embodiment, a network (e.g., that uses a network device 204) can maintain a database and upon setup of a voice call, incoming call metadata can be provided (e.g., metadata pertaining to a usage contract). The provided metadata can be detailed (e.g., providing identity, calling plan, remaining minutes, etc.) as well as limited (e.g., a notice if the user will be charged if the call is engaged, but not notifying the user of the fee and/or rate). In an alternative embodiment, the mobile device 202 can retain a database that is used to supply the metadata. While discussion herein relates to incoming communication, it is to be appreciated that aspects can be practiced concerning outgoing communication (e.g., notifying a user of a number of minutes remaining on a call plan before the user sends the call, disclosing to the user a number of text messages that can be sent free of charge, and the like).

While aspects disclosed herein are described as being implemented upon the mobile device 202 or network device 204 (e.g., server, base station, etc.), it is to be appreciated that implementation can occur upon the mobile device 202, network device 204, a third-party device, distributed across multiple devices, and the like. The mobile device 202 can include an evaluator 206 that determines (e.g., appreciates) a provider classification of an incoming communication (e.g., through use of an evaluator executable of the mobile device 202). The provider classification can include a name of the provider, a positive/negative level on if the provider would associate an additional charge to an incoming call, an amount of money associated with taking the incoming call, etc. A supplier 208 can be employed that discloses the provider classification determined by the evaluator 206. For example, supplier 208 can include, but is not limited to, an output device such as a display, a speaker, a haptic feedback device, etc., operable to communicate the determined provider classification to a user of mobile device 202. In one implementation, the supplier 208 discloses the provider classification through transfer of at least one bit (e.g., from network device 204 to mobile device 202) indicating that the provider classification is of a same provider (e.g., provider of an incoming call is a same provider used by the mobile device), equivalent provider (e.g., provider of an incoming call is associated with a provider used by the mobile device, such as through a contract agreement), or foreign provider (e.g., a provider of a mobile device is independent to a provider of an incoming call).

The network device 204 can signal metadata pertaining to an incoming call that relates to a usage agreement to the mobile device. A gatherer 210 can be used that collects metadata (e.g., caller identity, a provider used by the caller, how a contract relates to the mobile device, etc.) related to usage of the mobile device 202 in relation to an incoming communication. A determination can be made on what metadata should be disclosed to the user (e.g., based upon balancing importance against available screen size) and a presenter 212 can disclose at least a portion of the collected metadata. According to one embodiment, the disclosed metadata includes a number of overall remaining free minutes of a usage contract, a number of remaining free minutes with a particular provider, a number of remaining minutes for use in engagement of a communication, or a combination thereof.

Figure 3:
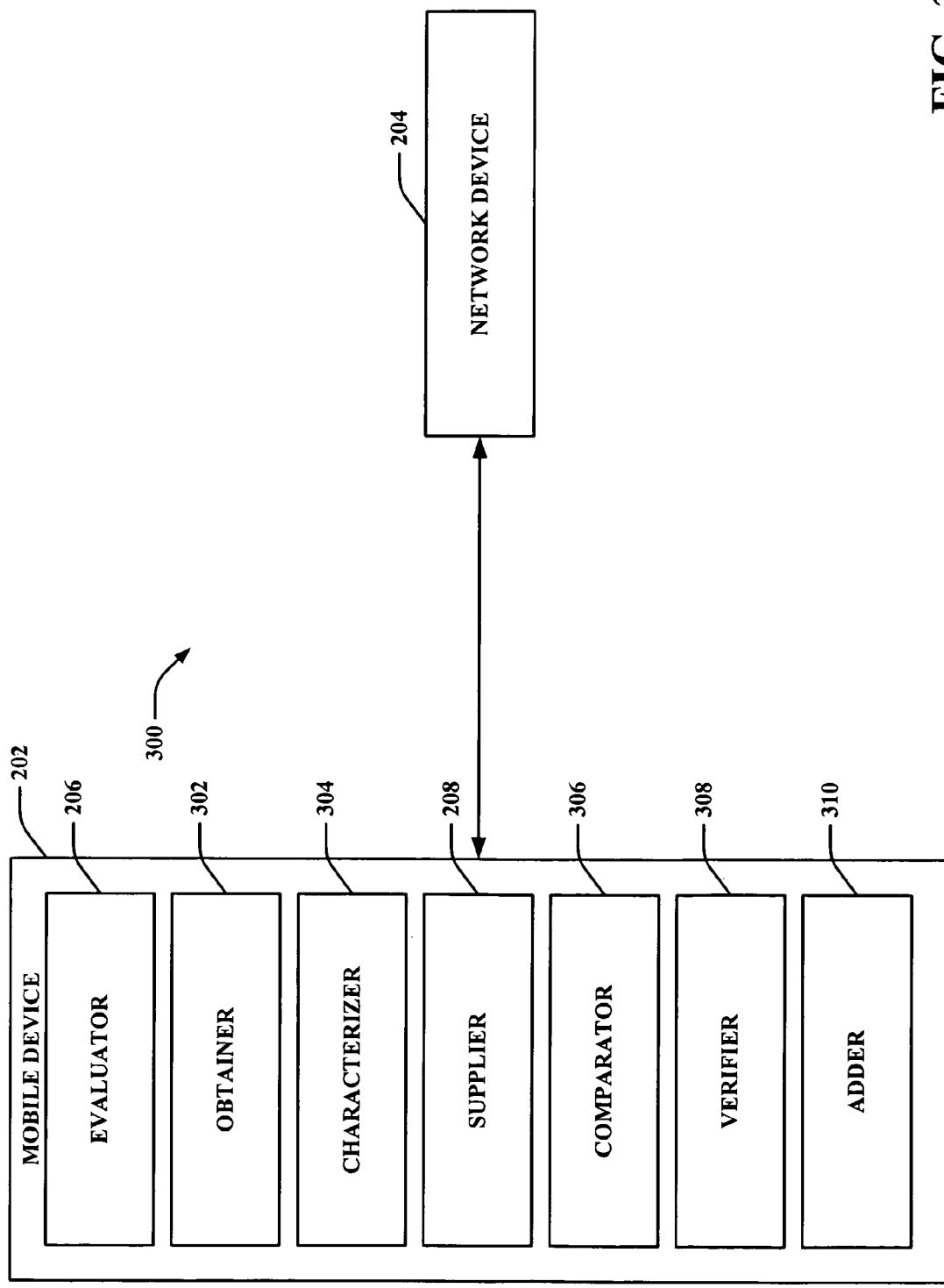
FIG. 3 is an illustration of an example system with a detailed mobile device in accordance with at least one aspect.

Now referring to FIG. 3, an example system 300 is disclosed with a detailed mobile device 202 for presentation of communication metadata. The mobile device 202 can use an evaluator 206 that appreciates a provider classification of an incoming communication. Different modules can be used to facilitate operation of the evaluator 206.

An obtainer 302 can be employed by the evaluator 206 and/or the mobile device 202 to collect an identity (e.g., of a caller for the incoming call). A characterizer 304 can function upon the collected identity such that there is a determination on the identity related to the incoming communication. In an illustrative embodiment, the obtainer 302 can access an identity (e.g., from a database of the mobile device 202) and the characterizer 304 can determine if the identity is that of the incoming caller. A supplier 208 can be used to disclose the identity (e.g., determined by the classifier 304) with disclosure of the provider classification.

In one implementation, the supplier 208 operates upon processing a notification of the incoming communication. For example, an incoming notification can be received and initial processing can be practiced. Upon performing at least a portion of the processing, information can be disclosed to the user thus allowing the user to make an informed decision on the incoming call (e.g., if the user should accept the call in relation to a number of minutes remaining). The supplier 208 can disclose metadata that concerns the provider classification along with disclosure of the provider classification. Example metadata can include identity of the caller, phone number of the caller, a photograph of the caller, battery level, and the like. The metadata can relate to a usage model for engaging in communication with a provider associated with the provider classification. In this instance, a contract can be evaluated and a determination can be made on if the caller falls within a usage model of the mobile device 202—a result of the determination can be disclosed to the user.

According to one embodiment, the provider classification is determined based upon a database of approved identities (e.g., if a caller is not in the database, then the call is not part of the usage plan and thus there is a negative classification). A comparator 306 can be used that compares the identity (e.g., obtained identity) against an identity list to determine if there is a match. The provider classification can be disclosed upon determining that the identity is not on the identity list through use of a result of the comparison. If the identity is on the list, then a standard presentation can take place (e.g., a name and number is shown since there is no additional cost with the call).

If it is determined that the identity is not on the list, then a verifier 308 can be used that determines if the collected identity should be populated upon the identity list. In one implementation, the population occurs upon making a positive determination that the collected identity should be added to the database. An adder 310 can be used that populates the identity list with at least one designated identity. An embodiment can be used such that the identity is collected and designated for population through user instruction.

It is possible that the determination is made through practice of at least one artificial intelligence technique. It is to be appreciated that artificial intelligence techniques can be used to practice determinations and inferences disclosed in the subject specification. These techniques employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These techniques can also include methods for capture of logical relationships such as theorem provers or more heuristic rule-based expert systems. These techniques can be represented as an externally pluggable module, in some cases designed by a disparate (third) party.

Figure 4:
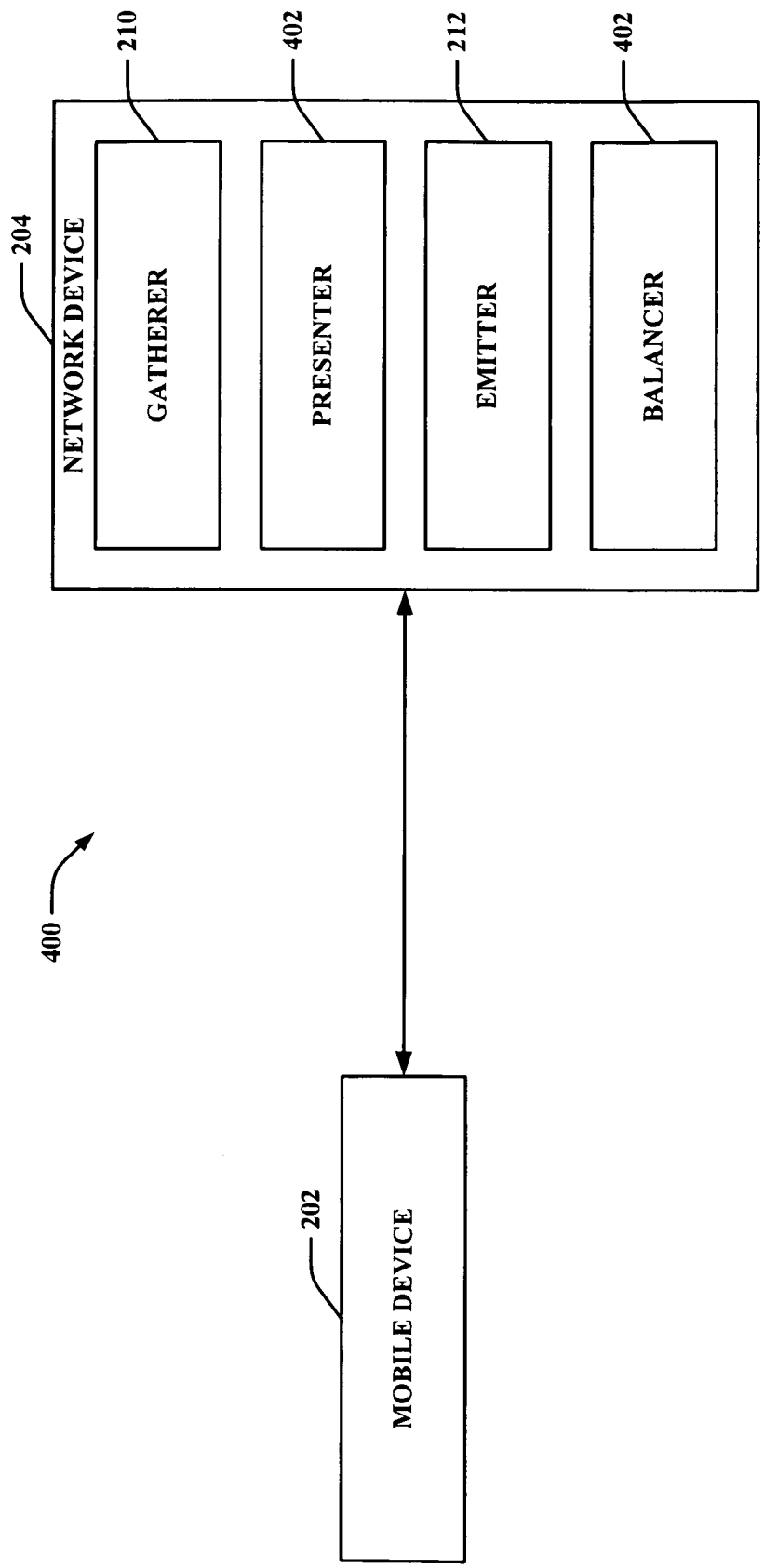
FIG. 4 is an illustration of an example system with a detailed network device in accordance with at least one aspect.

Now referring to FIG. 4, an example system 400 is disclosed for presentation of service agreement information in relation to an incoming communication (e.g., text message, telephone call, streamed video content, etc.). For example, network device 204 can become aware (e.g., through a relay assignment) of a text message to be transferred to a mobile device 202. The mobile device 202 can configure such that there is a limited number of message disclosures allowed per month. Therefore, it can be beneficial that a user be aware of the usage agreement before deciding if the message should be viewed.

A gatherer 210 can determine that a message is to relay to the mobile device 202 and collects metadata related to usage of a mobile device (e.g., usage contract metadata such as number of minutes remaining, provider of an incoming call, etc.) in relation to an incoming communication. At least a portion of the metadata can be collected from a database remote from the mobile device 202 (e.g., on the network device 204, at a remote location, etc.). A presenter 212 discloses at least a portion of the collected metadata, such a through an emitter 402 that transmits (e.g., wirelessly, through encryption, etc.) the metadata to the mobile device 202. The disclosed metadata can include a number (e.g., telephone number) or an identity (e.g., name) associated with the communication.

There can be an interest in charging a user to know if they have enough minutes left, if accepting a call will incur an additional charge, etc. For example, before opening the text message, a first communication can be presenting asking a user if she is willing to pay a fee to know how many text messages she has remaining in a month. A balancer 404 can be employed that performs a fiscal transaction in relation to providing the metadata (e.g., upon a user responding in an affirmative manner to the first communication. An example financial transaction is debiting an agreed amount of money from a checking account automatically.

Figure 5:
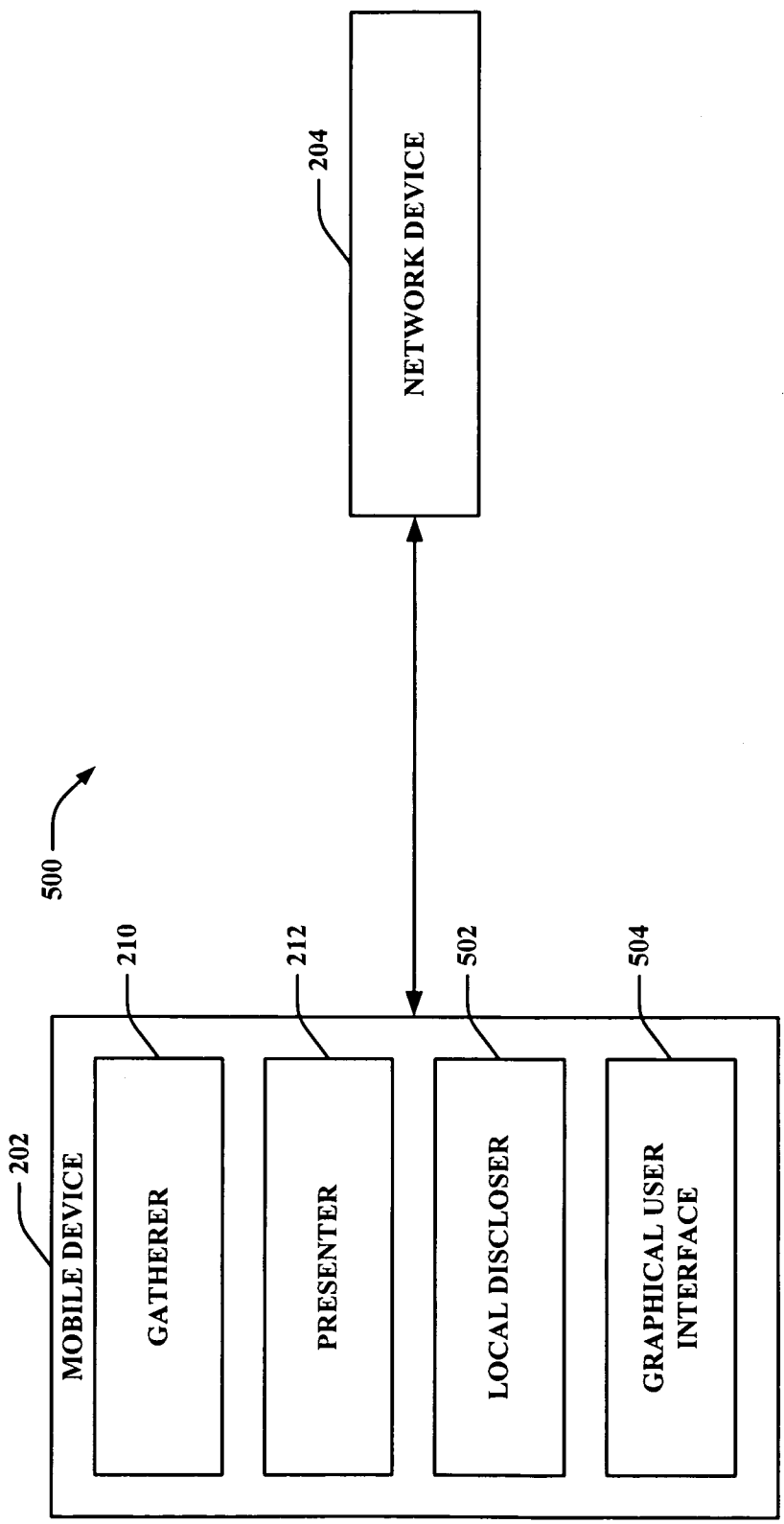
FIG. 5 is an illustration of an example system with an alternative mobile device in accordance with at least one aspect.

Referring to FIG. 5, an example system 500 is disclosed for communicating information pertaining to a correspondence with operation taking place upon a mobile device 202 that communicates with a network device 204. A gatherer 210 can collect metadata associated to usage of the mobile device 202 in relation to an incoming communication, such that at least part of the metadata originates from a database local to the mobile device 202 (e.g., embedded storage, memory operatively and physically coupled to the mobile device 202, etc.). A presenter 212 can determine a portion of the metadata that should be disclosed and disclose the determined portion. For example, the disclosed metadata can include a usage classification (e.g. provider name) associated with a number or an identity, an amount of communication time that remains (e.g., a user has about 400 minutes remaining, a user has about 400 minutes of free non-provider time remaining, etc.) associated with the usage of the mobile device, a number of engagements (e.g., a plan can receive about 10 free text messages) that remain associated with the usage of the mobile device, or a combination thereof.

According to one embodiment, a local disclosure 502 can be used that presents the metadata through the mobile device 202. For instance, presentation of the metadata through the mobile device 202 occurs through use of a graphical user interface (GUI) 504. The GUI 504 can also be used to engage with a user to determine if metadata should be disclosed. In an illustrative implementation, a user can program the presenter 212 on what metadata should be disclosed for an incoming call through the GUI 504. For instance, once a user account is below about 100 minutes, the user can be presented with metadata on remaining minutes.

Figure 6:
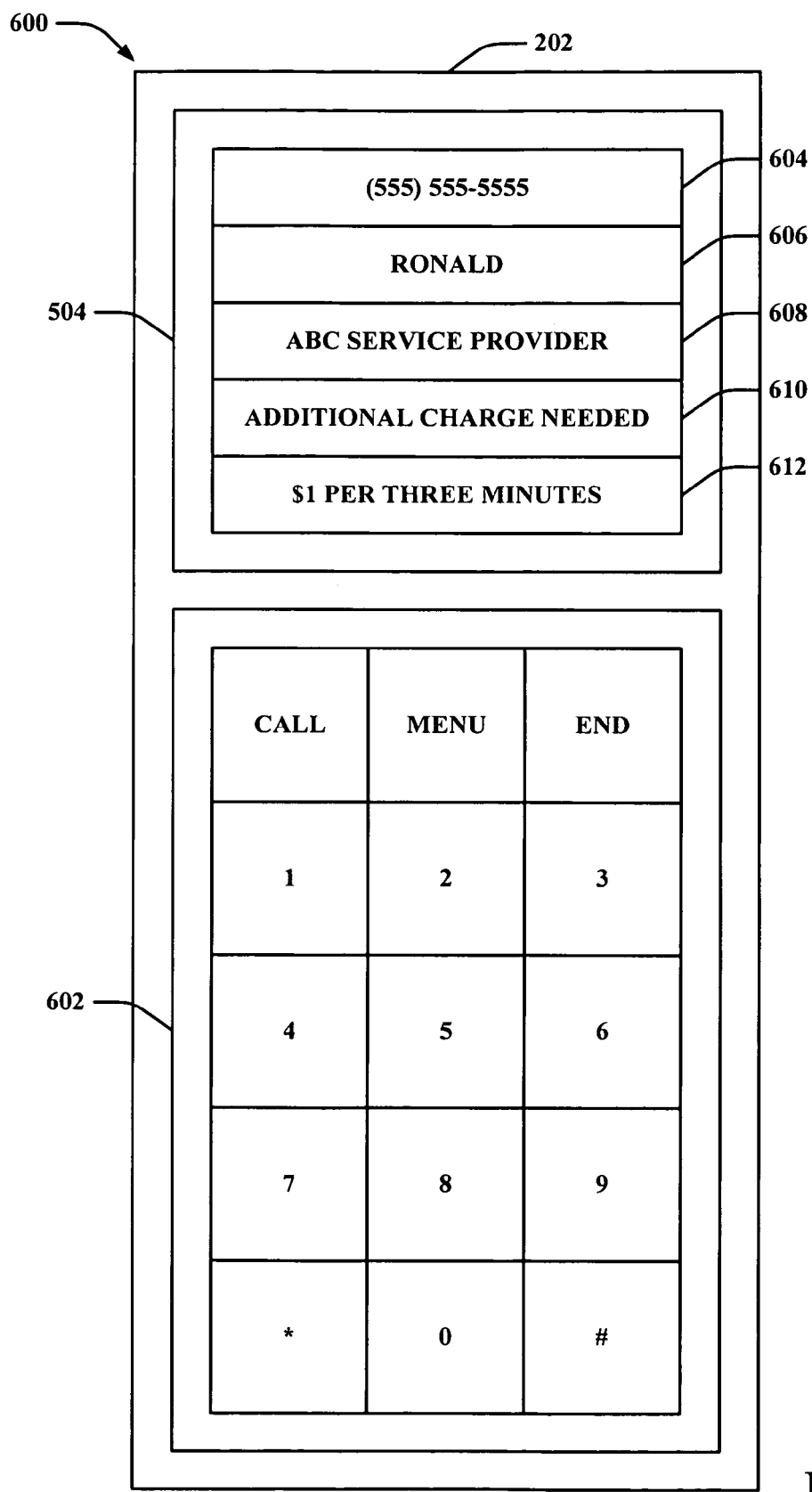
FIG. 6 is an illustration of an example system with a mobile device including a dial pad and display in accordance with at least one aspect.

Now referring to FIG. 6, an example system 600 is disclosed highlighting a representative configuration for a mobile device 202. The mobile device 202 can configure with two engagement portions—the GUI 504 and an entry pad 602. The GUI 504 can include a number of different fields that can be modified and/or changed based upon contextual circumstances. For instance, when an incoming call is obtained, there can be a field for number 604, name 606, provider 608, charge notification 610, and charge rate 612.

Alternative fields can also be used in the GUI for an incoming communication, such as a photograph, minutes remaining, service plan metadata, and the like. These different fields can be customized by the user (e.g., through entry from the entry pad 602). According to one implementation, the provider 608, change notification 610, charge rate 612, or a combination thereof, as well as other fields can be considered to disclose the provider classification. The entry pad 602 can be used for input of information from the user and can implement as part of the GUI 504, be a mechanical implementation separate form the GUI, etc.

Figure 7:
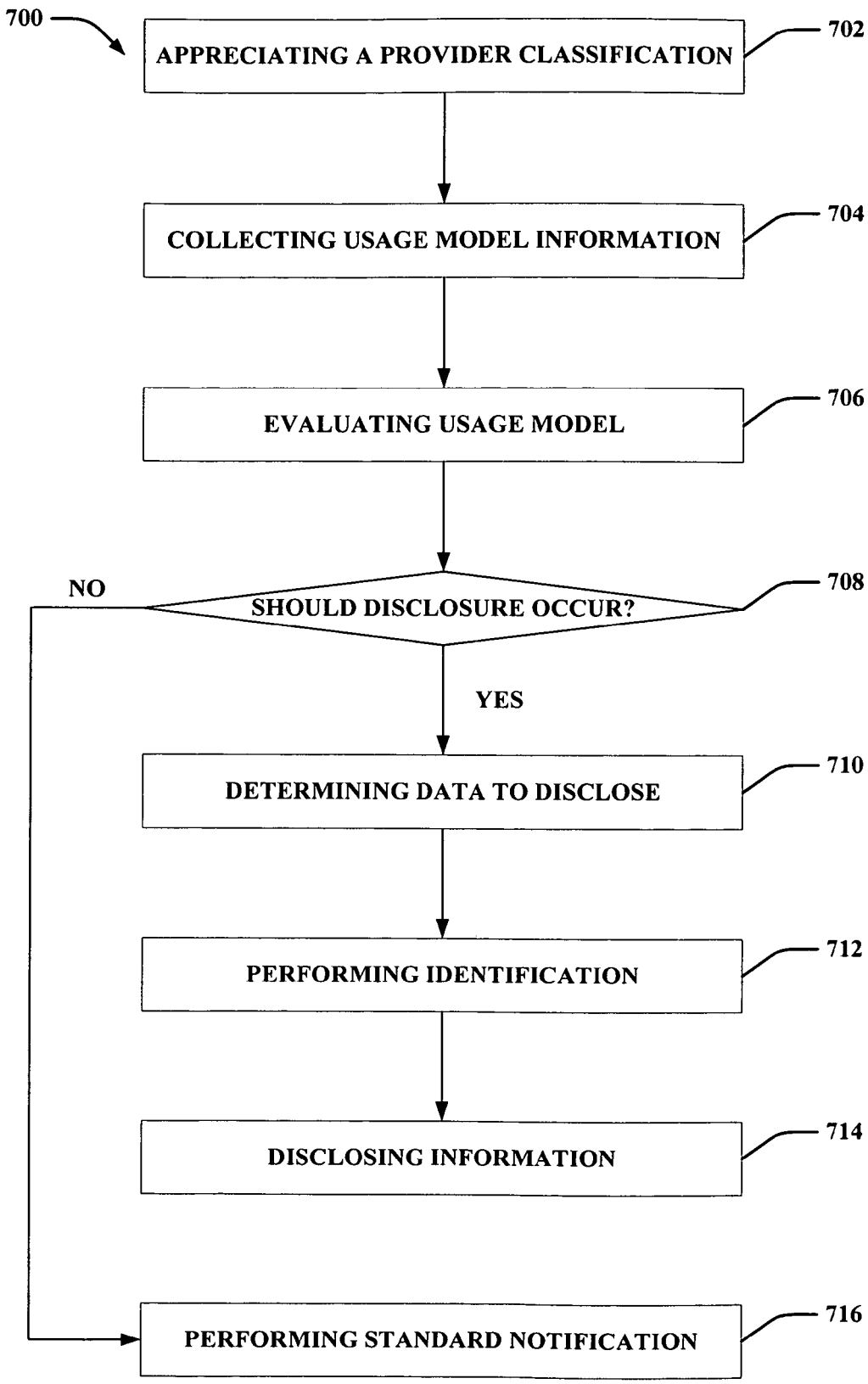
FIG. 7 is an illustration of an example methodology for information disclosure in accordance with at least one aspect.

Referring to FIG. 7, an example methodology 700 is disclosed for supplying provider classification information. There can be determining (e.g., appreciating) a provider classification of an incoming communication at 702—this can be performed through evaluating metadata associated with the communication. At 704 there can be collecting usage model information such as a user agreement, a report on a number of minutes a user has remaining in a contract, data on how many minutes a user has remaining with a certain provider, how large of text message files can be downloaded without having to pay a penalty, etc.

The usage model can be evaluated at 706 and at 708 a check can take place to determine if there should be a disclosure. If there should be a disclosure, then a determination can be made at 710 on which data (e.g., usage model data) to disclose based upon a result of the evaluation. Identification can take place at 712 (e.g., determining an identity of an entity that originates the communication) and the identification and determined data can be disclosed at 714. Moreover, 714 can include disclosing the provider classification, disclosing metadata concerning the provider classification along with disclosing the provider classification, transmitting the provider classification to a mobile device or presenting the provider classification through the mobile device, or a combination thereof. If 708 determines that there should not be a disclosure (e.g., of data pertaining to the usage model), then standard notification can occur at 716 (e.g., displaying name and number).

Figure 8:
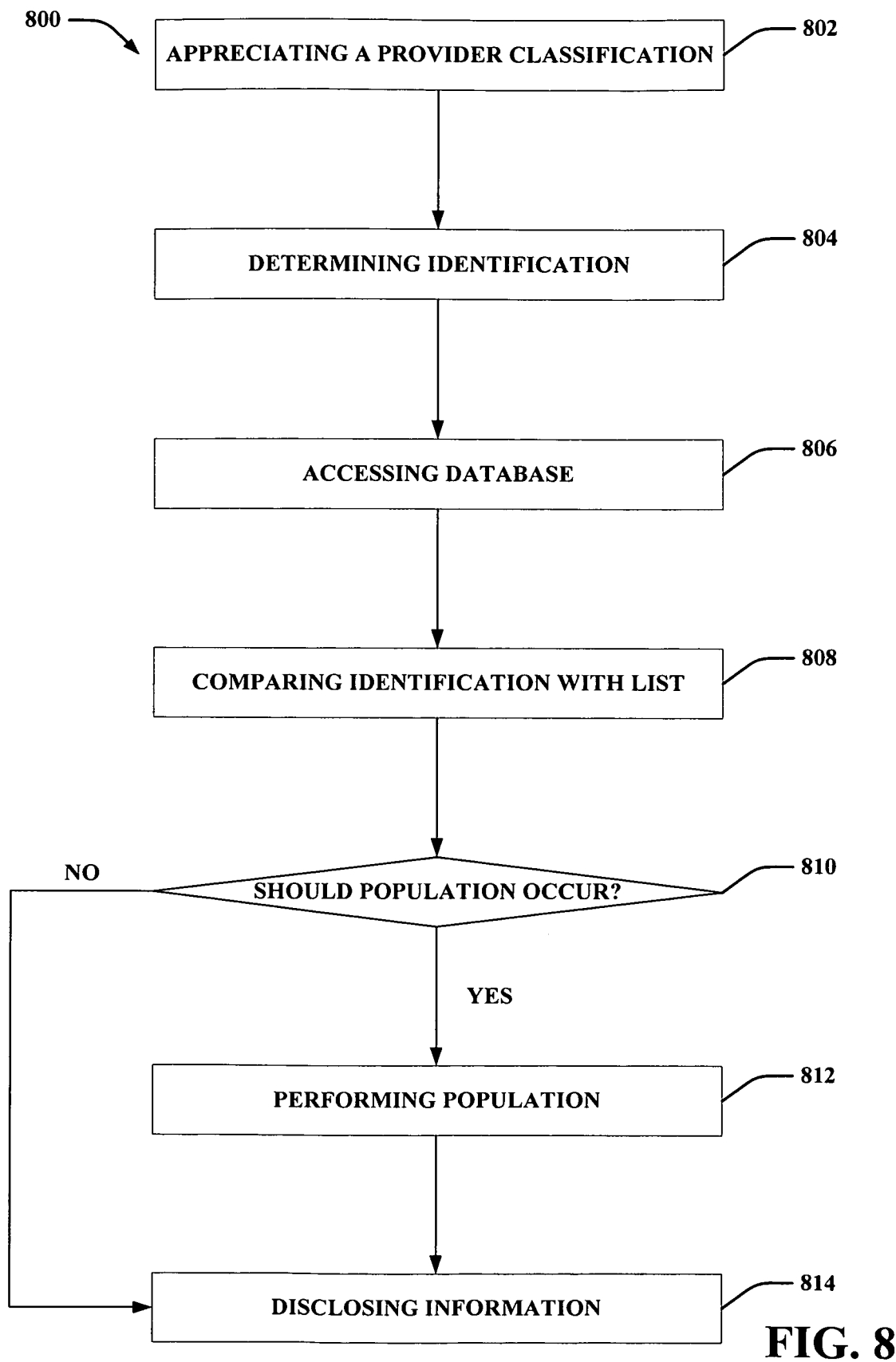
FIG. 8 is an illustration of an example methodology for list production in accordance with at least one aspect.

Now referring to FIG. 8, an example methodology 800 is disclosed for creating a list that relates to identities. Aspects disclosed herein relate to disclosing of provider metadata related to a communication; however, it is possible that some individuals are important enough that a user does not want to see provider information, associated cost data, remaining time metadata, etc. For instance, since screen real estate can be consumed to disclosed the provider classification, a user can desire that her spouse be transferred through without the calling information. In one implementation, the sender of the communication can dictate if the provider classification information should be disclosed to the user.

Thus, at 802 there can be appreciating a provider classification of an incoming communication. An identity of the communication provider can be ascertained and determined at 804. A database can be accessed at 806 and the determined identity can be compared against entries in the database at 808. If it is determined that the identity is not on retained upon the database 808, then at 810 a check can take place to determine if the identity should be populated upon the database. Upon a positive determination population can occur at 812 and regardless of if population occurs, there can be disclosing the provider classification at 814.

Figure 9:
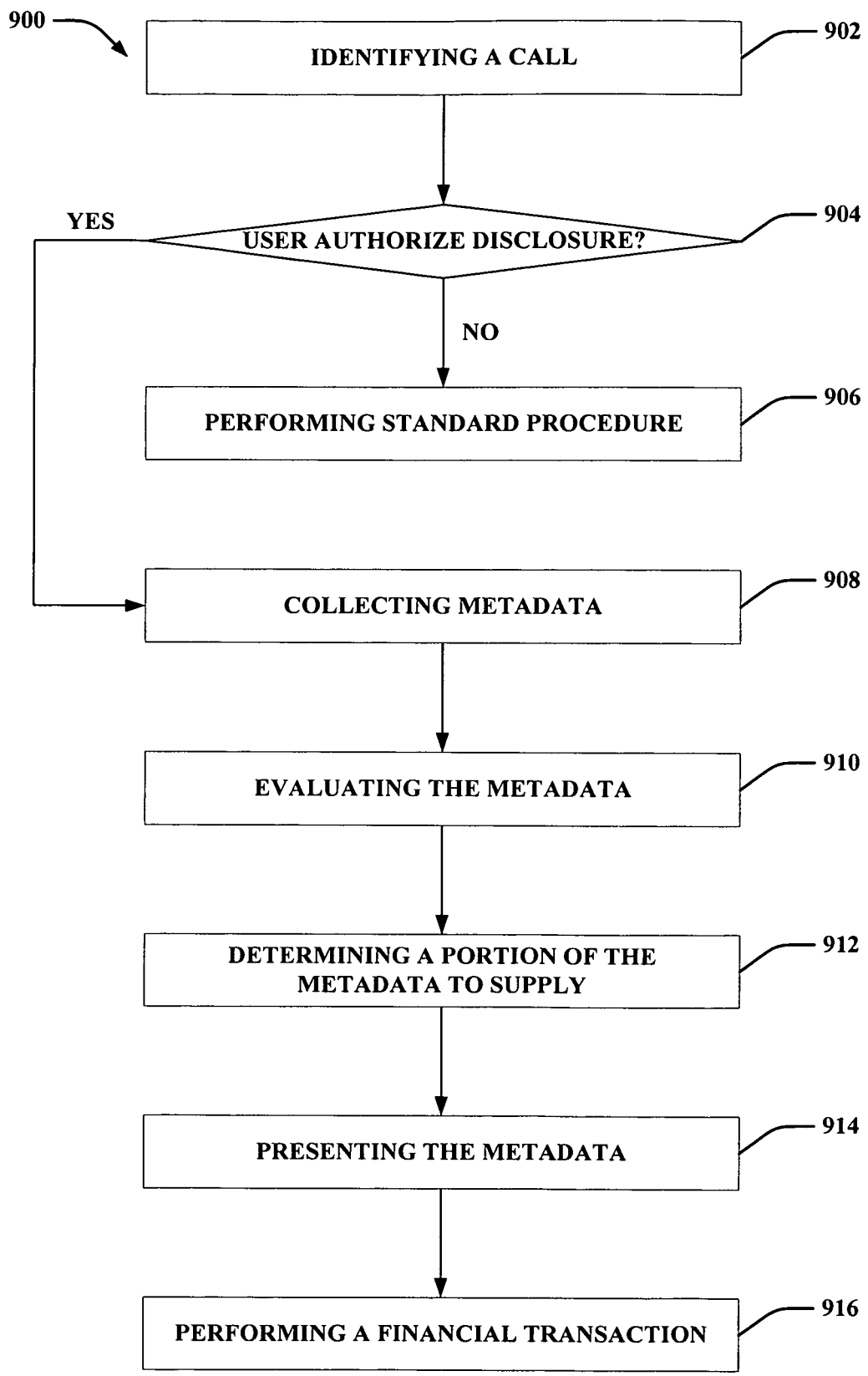
FIG. 9 is an illustration of an example system methodology for metadata disclosure in accordance with at least one aspect.

Referring now to FIG. 9, an example methodology 900 is disclosed for regulating communication of information. A call can be identified at 902 and a request can be made to a user if she would like to view information related to a contract (e.g., usage agreement). The user can respond and based upon the response at 904 a check can be made on if disclosure should occur. The request of the user can be general (e.g., please disclose usage information) or specific (e.g., please disclose a number of minutes remaining). If there is not to be a usage disclosure, then a standard disclosure can occur (e.g., name, photograph, etc.).

If there is to be a disclosure related to usage, then 908 can be performed for collecting metadata related to usage of a mobile device in relation to an incoming communication. The collected metadata can be evaluated at 910 and at least a portion of the metadata can be selected for distribution at 912 (e.g., distributed locally, distributed remotely, etc.). At 914 there can be disclosing at least a portion of the collected metadata. Additionally, a financial transaction can be performed at 916—such as a transaction approved through functioning of 904 (e.g., to gain the information, the user agrees to a fee).

Referring to FIGS. 7-9, methodologies relating to information disclosure for an incoming correspondence. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

It will be appreciated that, in accordance with one or more aspects described herein, inferences can be made regarding whether information should be disclosed, what metadata should be presented, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting a manner in which to present information (e.g., how information should be formatted, where to place information, etc.). By way of further illustration, an inference can be made related to selecting a number of physical frames as a wakeup period parameter based upon intended application, desired power savings, etc. It will be appreciated that the foregoing examples are illustrative in nature and are not intended to limit the number of inferences that can be made or the manner in which such inferences are made in conjunction with the various embodiments and/or methods described herein.

Figure 10:
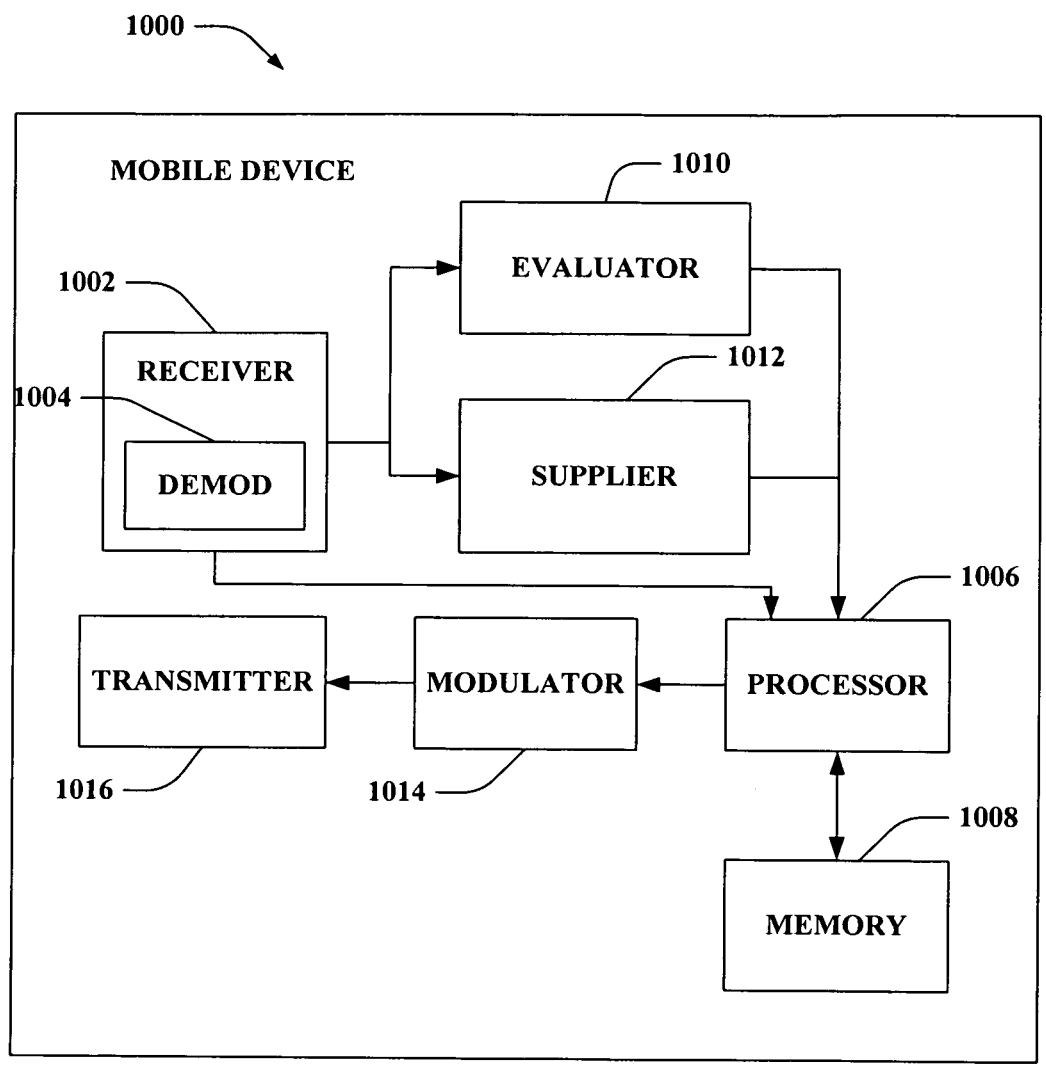
FIG. 10 is an illustration of an example mobile device that facilitates metadata relates in accordance with at least one aspect.

FIG. 10 is an illustration of a mobile device 1000 that facilitates disclosing call information upon the mobile device 1000. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000.

Mobile device 1000 can additionally comprise memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1002 is further operatively coupled to an evaluator 1010 and/or a supplier 1012. The evaluator can appreciate a provider classification of an incoming communication. In addition, the supplier can disclose the provider classification. Mobile device 1000 still further comprises a modulator 1014 and a transmitter 1016 that transmits a signal (e.g., base CQI and differential CQI) to, for instance, a base station, another mobile device, etc. Although depicted as being separate from the processor 1006, it is to be appreciated that the evaluator 1010 and/or supplier 1012 can be part of processor 1006 or a number of processors (not shown).

Figure 11:
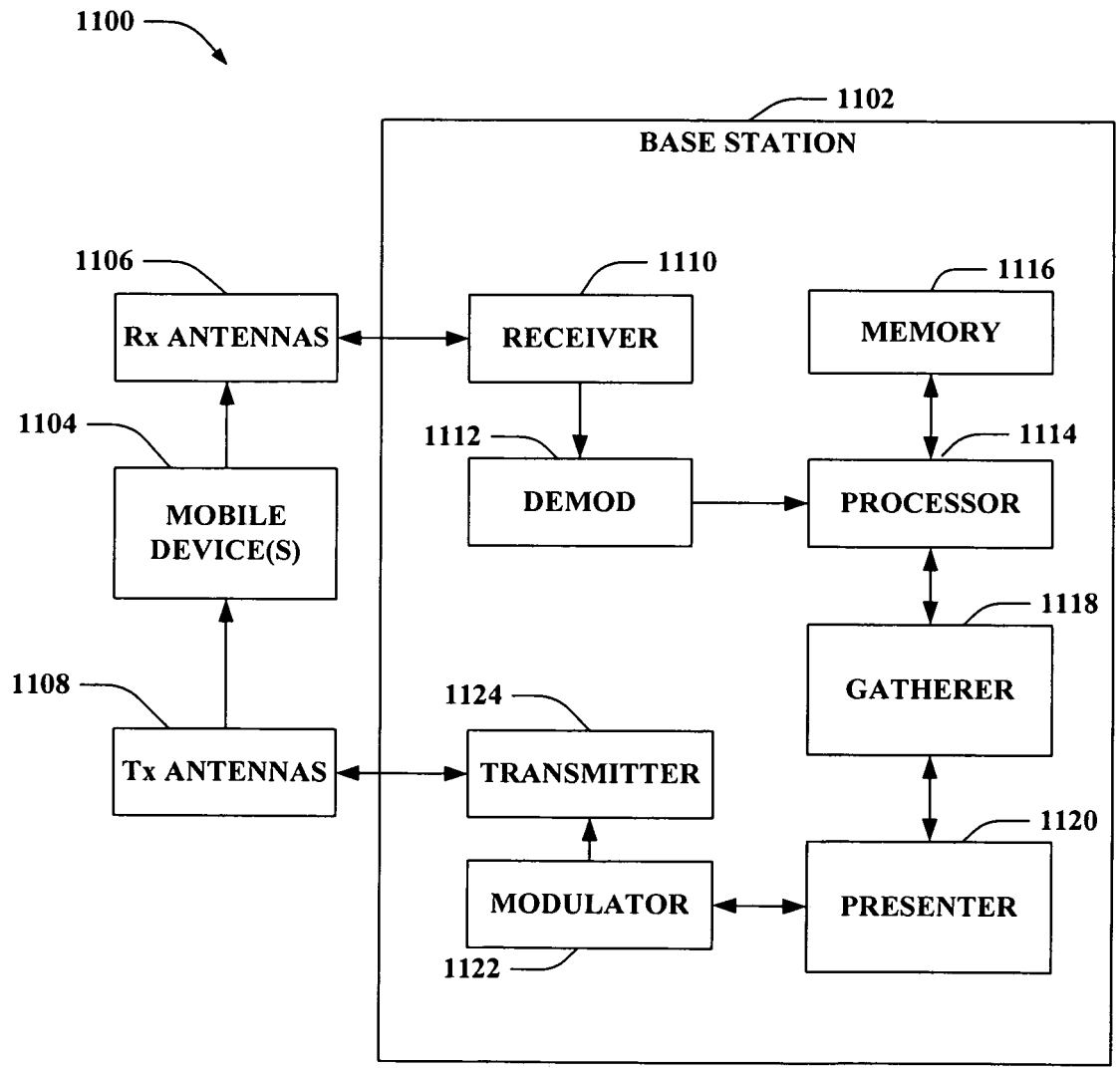
FIG. 11 is an illustration of an example system that facilitates information divulgence in accordance with at least one aspect.

FIG. 11 is an illustration of a system 1100 that facilitates disclosure of information concerning an incoming communication. System 1100 comprises a base station 1102 (e.g., access point, . . . ) with a receiver 1110 that receives signal(s) from one or more mobile devices 1104 through a plurality of receive antennas 1106, and a transmitter 1122 that transmits to the one or more mobile devices 1104 through a plurality of transmit antennas 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein.

Processor 1114 is further coupled to a gatherer 1118 and/or to a presenter 1120. The gatherer 1118 can collect metadata related to usage of a mobile device in relation to an incoming communication. A presenter 1120 can be employed that discloses at least a portion of the collected metadata. Information to be transmitted can be provided to a modulator 1122. Modulator 1122 can multiplex the information for transmission by a transmitter 1124 through antenna 1108 to mobile device(s) 1104. Although depicted as being separate from the processor 1114, it is to be appreciated that the gatherer 1118 and/or presenter 1120 can be part of processor 1114 or a number of processors (not shown).

Figure 12:
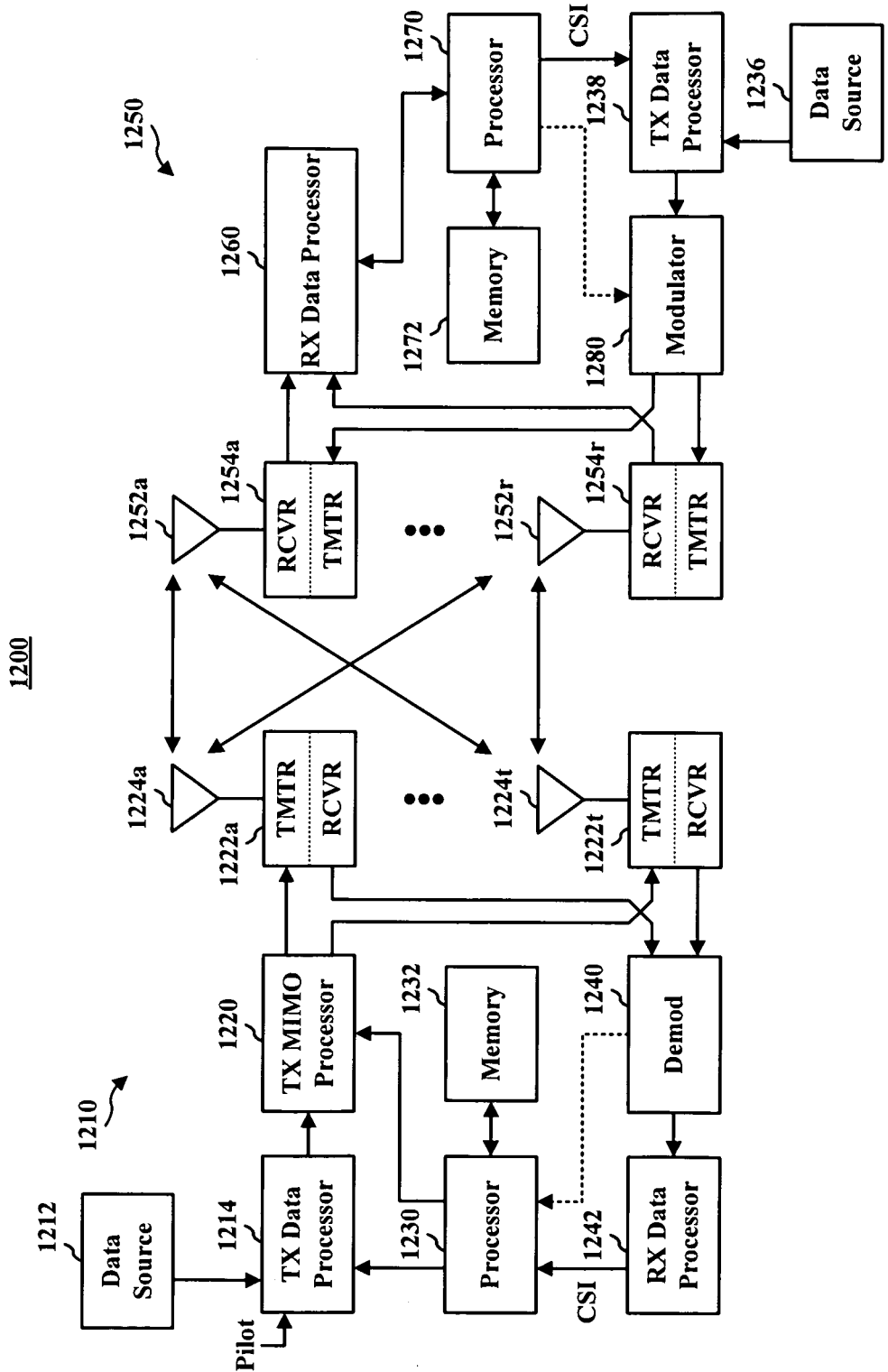
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-6 and 10-11) and/or methods (FIGS. 7-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250, the transmitted modulated signals are received by N$R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
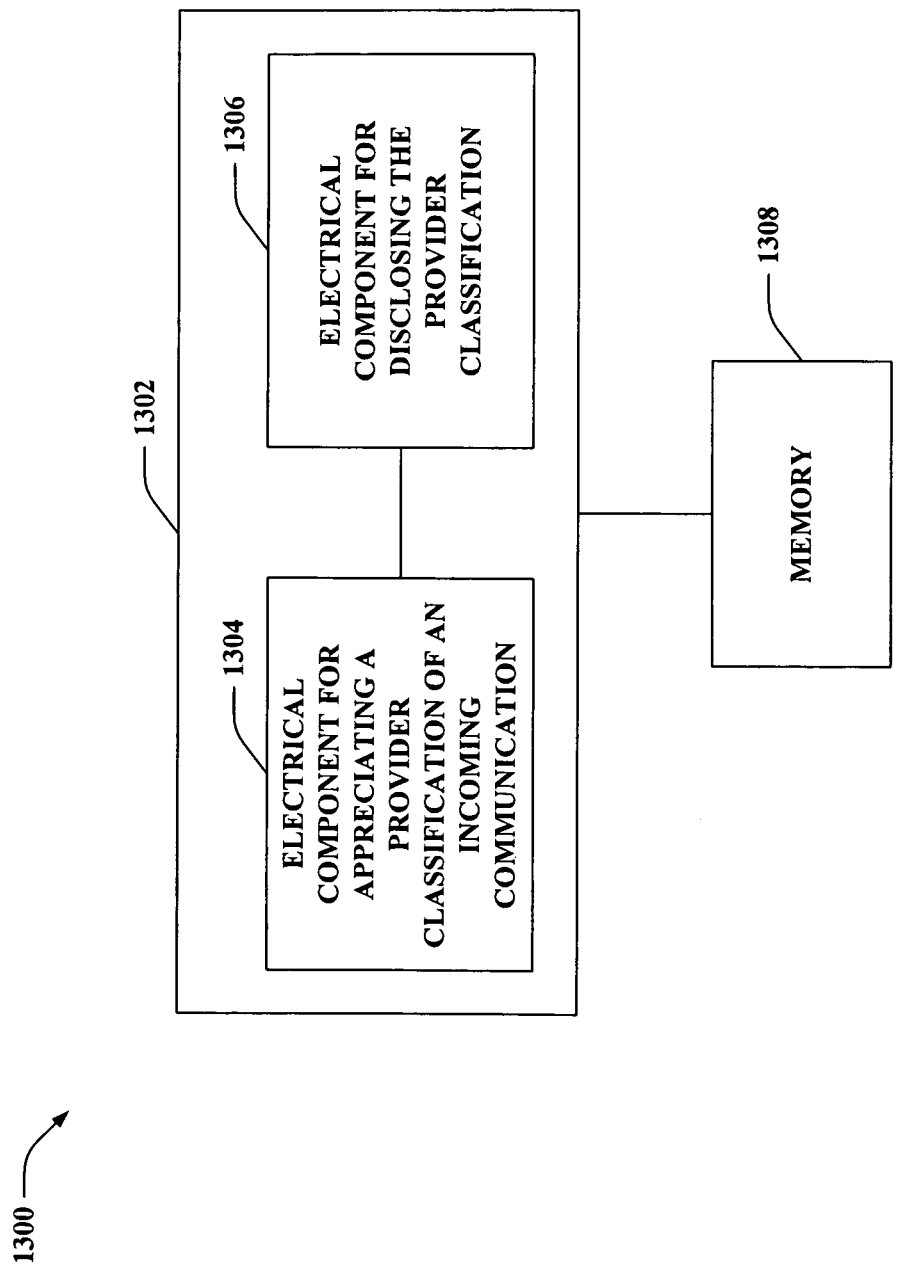
FIG. 13 is an illustration of an example system that submits classification information in accordance with at least one aspect.

With reference to FIG. 13, illustrated is a system 1300 that manages information disclosure in relation to an incoming cellular communication. For example, system 1300 can reside at least partially within a mobile device. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for appreciating a provider classification of an incoming communication 1304 and/or an electrical component for disclosing the provider classification 1306. Additionally, system 1300 can include a memory 1308 that retains instructions for executing functions associated with electrical components 1304 and 1306. While shown as being external to memory 1308, it is to be understood that one or more of electrical components 1304 and 1306 can exist within memory 1308.

Figure 14:
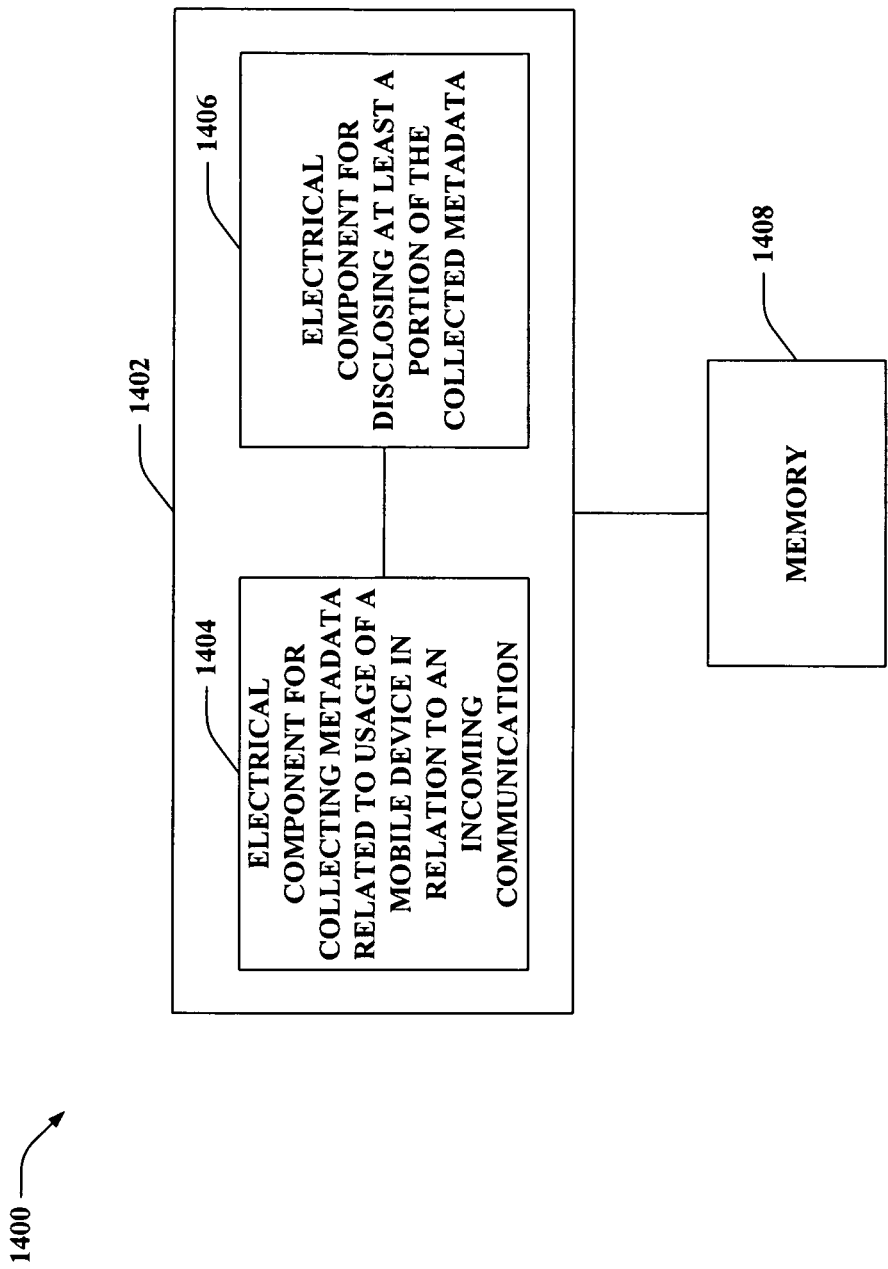
FIG. 14 is an illustration of an example system that determines metadata for disclosure in relation to an incoming correspondence in accordance with at least one aspect.

Turning to FIG. 14, illustrated is a system 1400 that manages information production. System 1400 can reside within a base station, for instance. As depicted, system 1400 includes functional blocks that can represent functions implemented by a processor, software, or combination thereof (e.g., firmware). System 1400 includes a logical grouping 1402 of electrical components that facilitate controlling forward link transmission. Logical grouping 1402 can include an electrical component for collecting metadata related to usage of a mobile device in relation to an incoming communication 1404. In addition, the logical grouping 1402 can include an electrical component for disclosing at least a portion of the collected metadata 1406. Additionally, system 1400 can include a memory 1408 that retains instructions for executing functions associated with electrical components 1404 and 1406. While shown as being external to memory 1408, it is to be understood that electrical components 1404 and 1406 can exist within memory 1408.

The various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described above.

Further, the steps and/or actions of a method or algorithm described in connection with the aspects disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, such that the processor can read information from, and write information to, the storage medium. In the alternative, the storage medium can be integral to the processor. Further, in some aspects, the processor and the storage medium can reside in an ASIC. Additionally, the ASIC can reside in a user terminal. In the alternative, the processor and the storage medium can reside as discrete components in a user terminal. Additionally, in some aspects, the steps and/or actions of a method or algorithm can reside as one or any combination or set of codes and/or instructions on a machine readable medium and/or computer readable medium, which can be incorporated into a computer program product.

In one or more aspects, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments can be described or claimed in the singular, the plural is contemplated unless limitation to the singular is explicitly stated. Additionally, all or a portion of any aspect and/or embodiment can be utilized with all or a portion of any other aspect and/or embodiment, unless stated otherwise.

What is claimed is:

1. A method operable on a wireless communication device for disclosing communication metadata, comprising:
   determining a provider classification of an incoming communication by an evaluator executable upon the wireless communication device, wherein the provider classification includes at least one of a same provider that is a service provider of the wireless communication device, an associated provider that is different than the service provider for the wireless communication device or a foreign provider that is independent from the service provider for the wireless communication device;
   determining if there should be a disclosure of the communication metadata based on an identity of a sender of the incoming communication, wherein if it is determined that the identity of the sender is not on an identity list, a verifier executable upon the wireless communication device determines whether the identity list should be populated with the identity of the sender;
   responsive to determining that the communication metadata should be disclosed and that the provider classification is the same provider or the associated provider, disclosing on the wireless communication device that there is no charge for the incoming communication; and
   responsive to determining that the communication metadata should be disclosed and that the provider classification is the foreign provider, disclosing on the wireless communication device at least one of minutes remaining or a charge rate for the incoming communication.

2. The method of claim 1, wherein disclosing the provider classification occurs upon processing a notification of the incoming communication.

3. The method of claim 2, further comprising disclosing metadata concerning the provider classification along with disclosing the provider classification, wherein the metadata relates to a usage model for engaging in communication with a provider associated with the provider classification.

4. The method of claim 1, disclosing the provider classification comprises transferring at least one bit indicating that the provider classification is of the same provider, associated provider, or foreign provider.

5. The method of claim 1, further comprising:
   determining the identity of the sender of the incoming communication; and
   disclosing the identity with disclosing the provider classification.

6. The method of claim 5, further comprising comparing the identity against an identity list, wherein the provider classification is disclosed upon determining that the identity is not on the identity list through use of a result of the comparison.

7. The method of claim 6, further comprising populating the identity list with at least one designated identity.

8. The method of claim 7, further comprising:
   collecting the identity;
   wherein the population occurs upon making a positive determination that the collected identity should be populated.

9. The method of claim 8, wherein the identity is collected through user instruction.

10. The method of claim 8, wherein the determination is made through practice of at least one artificial intelligence technique.

11. The method of claim 1, further comprising disclosing the provider classification comprises transmitting the provider classification to a mobile device or presenting the provider classification through the mobile device.

12. The method of claim 1, wherein the associated provider has an agreement with the same provider that provides service to the wireless communication device.

13. The method of claim 1, further comprising determining an amount of communication the wireless communication device is authorized to conduct prior to incurring additional charges for the incoming communication; and
   wherein the notifying includes notifying using an output device of the wireless communication device a fee that is incurred by accepting the incoming communication.

14. An apparatus, comprising:
   an evaluator that determines a provider classification of an incoming communication, wherein the provider classification includes at least one of a same provider that is a service provider of a wireless communication device, an associated provider that is different than the service provider for the wireless communication device or a foreign provider that is independent from the service provider of the wireless communication device;
   a comparator that determines if there should be a disclosure of communication metadata based on an identity of a sender of the incoming communication;
   a verifier that determines whether an identity list should be populated with the identity of the sender if it is determined that the identity of the sender is not on the identity list; and
   a supplier responsive to determining that the communication metadata should be disclosed and that the provider classification is the same provider or the associated provider, discloses that there is no charge for the incoming communication, and the supplier responsive to determining that the communication metadata should be disclosed and that the provider classification is the foreign provider, discloses at least one of minutes remaining or a charge rate for the incoming communication.

15. The apparatus of claim 14, wherein the supplier operates upon processing a notification of the incoming communication.

16. The apparatus of claim 15, wherein the supplier discloses metadata that concerns the provider classification along with disclosure of the provider classification and the metadata relates to a usage model for engaging in communication with a provider associated with the provider classification.

17. The apparatus of claim 14, wherein the supplier discloses the provider classification through transfer of at least one bit indicating that the provider classification is of the same provider, associated provider, or foreign provider.

18. The apparatus of claim 14, further comprising a characterizer that determines the identity of the sender of the incoming communication, wherein the supplier discloses the identity with disclosure of the provider classification.

19. The apparatus of claim 18, wherein the comparator compares the identity against an identity list, and wherein the provider classification is disclosed upon determining that the identity is not on the identity list through use of a result of the comparison.

20. The apparatus of claim 19, further comprising an adder that populates the identity list with the identity.

21. The apparatus of claim 20, further comprising:
   an obtainer that collects the identity,
   wherein the population occurs upon making a positive determination that the collected identity should be populated.

22. The apparatus of claim 21, wherein the identity is collected through user instruction.

23. The apparatus of claim 21, wherein the determination is made through practice of at least one artificial intelligence technique.

24. The apparatus of claim 23, wherein the supplier discloses the provider classification comprises transmitting the provider classification to a mobile device or presenting the provider classification through the mobile device.

25. At least one processor configured to disclose communication metadata, comprising:
- a first module for determining a provider classification of an incoming communication, wherein the provider classification includes at least one of a same provider that is a service provider of a wireless communication device, an associated provider that is different than the service provider for the wireless communication device or a foreign provider that is independent from the service provider of the wireless communication device;
- a second module that determines if there should be a disclosure of the communication metadata based on an identity of a sender of the incoming communication;
- a third module that determines whether an identity list should be populated with the identity of the sender if it is determined that the identity of the sender is not on the identity list; and
- a fourth module responsive to determining that the communication metadata should be disclosed and that the provider classification is the same provider or the associated provider disclosing that there is no charge for the incoming communication, and responsive to determining that the communication metadata should be disclosed and that the provider classification is the foreign provider disclosing at least one of minutes remaining or a charge rate for the incoming communication.

26. A processor that is in communication with a non-transitory computer readable storage medium that stores a program product that when executed by the processor causes the processor to perform a process, the process comprising:
- causing the processor to determine a provider classification of an incoming communication, wherein the provider classification includes at least one of a same provider that is a service provider of a wireless communication device, an associated provider that is different than the service provider for the wireless communication device or a foreign provider that is independent from the service provider of the wireless communication device;
- causing the processor to determine if there should be a disclosure of communication metadata based on an identity of a sender of the incoming communication;
- causing the processor to determine whether an identity list should be populated with the identity of the sender if it is determined that the identity of the sender is not on the identity list; and
- causing the processor to disclose that there is no charge for the incoming communication responsive to determining that the communication metadata should be disclosed and that the provider classification is the same provider or the associated provider, and causing the processor to disclose at least one of minutes remaining or a charge rate for the incoming communication responsive to determining that the communication metadata should be disclosed and that the provider classification is the foreign provider.

27. An apparatus, comprising:
- means for determining a provider classification of an incoming communication, wherein the provider classification includes at least one of a same provider that is a service provider of a wireless communication device, an associated provider that is different than the service provider for the wireless communication device or a foreign provider that is independent from the service provider of the wireless communication device;
- means for determining if there should be a disclosure of communication metadata based on an identity of a sender of the incoming communication;
- means for determining whether an identity list should be populated with the identity of the sender if it is determined that the identity of the sender is not on the identity list; and
- means for disclosing that there is no charge for the incoming communication responsive to determining that the communication metadata should be disclosed and that the provider classification is the same provider or the associated provider, and for disclosing at least one of minutes remaining or a charge rate for the incoming communication responsive to determining that the communication metadata should be disclosed and that the provider classification is the foreign provider.

28. A method operable on a wireless communication device for communication regulation, comprising:
- collecting metadata related to usage of a mobile device in relation to an incoming communication by an entity of the wireless communication device, wherein the metadata includes a provider classification that includes at least one of a same provider that is a service provider of the wireless communication device, an associated provider that is different than the service provider for the wireless communication device or a foreign provider that is independent from the service provider of the wireless communication device;
- determining if there should be a disclosure of the metadata based on an identity of a sender of the incoming communication, wherein if it is determined that the identity of the sender is not on an identity list, a verifier executable upon the wireless communication device determines whether the identity list should be populated with the identity of the sender;
- responsive to determining that the metadata should be disclosed and that the provider classification is the same provider or the associated provider, disclosing at least a portion of the collected metadata by an entity of the wireless communication device and that there is no charge for the incoming communication; and
- responsive to determining that the metadata should be disclosed and that the provider classification is the foreign provider, disclosing at least one of minutes remaining or a charge rate for the incoming communication.

29. The method of claim 28, wherein the disclosed metadata includes a number or the identity associated with the communication.

30. The method of claim 28, disclosing at least a portion of the collected metadata comprises presenting the metadata through the mobile device.

31. The method of claim 30, presenting the metadata through the mobile device occurs through use of a graphical user interface.

32. The method of claim 30, wherein the metadata is collected from a database local to the mobile device.

33. The method of claim 28, disclosing at least a portion of the collected metadata comprises transmitting the metadata to a mobile device, wherein the metadata is collected from at least one database remote from the mobile device.

34. The method of claim 28, wherein the disclosed metadata includes a number of overall remaining free minutes of a usage contract, a number of remaining free minutes with a particular provider, a number of remaining minutes for use in engagement of a communication, or a combination thereof.

35. The method of claim 28, further comprising performing a fiscal transaction in relation to providing the metadata.

36. The method of claim 28, wherein the disclosed metadata includes a usage classification associated with a number or the identity.

37. The method of claim 28, wherein the disclosed metadata includes an amount of communication time remaining associated with the usage of the mobile device.

38. The method of claim 28, wherein the disclosed metadata includes a number of engagements remaining associated with the usage of the mobile device.

39. An apparatus, comprising:
a gatherer that collects metadata related to usage of a mobile device in relation to an incoming communication, the metadata includes a provider classification that includes at least one of a same provider that is the service provider of a wireless communication device, an associated provider that is different than the provider for the wireless communication device or a foreign provider that is independent from the same provider of the wireless communication device;
a comparator that determines if there should be a disclosure of the metadata based on an identity of a sender of the incoming communication;
a verifier that determines whether an identity list should be populated with the identity of the sender if it is determined that the identity of the sender is not on the identity list; and
a presenter that discloses that there is no charge for the incoming communication responsive to determining that the metadata should be disclosed and that the provider classification is the same provider or the associated provider, and that discloses at least one of minutes remaining or a charge rate for the incoming communication responsive to determining that the metadata should be disclosed and that the provider classification is the foreign provider.

40. The apparatus of claim 39, wherein the disclosed metadata includes a number or the identity associated with the communication.

41. The apparatus of claim 39, wherein the presenter comprises a local disclosure that presents the metadata through the mobile device.

42. The apparatus of claim 41, wherein presentation of the metadata through the mobile device occurs through use of a graphical user interface.

43. The apparatus of claim 41, wherein the metadata is collected from a database local to the mobile device.

44. The apparatus of claim 39, wherein the presenter comprises an emitter that transmits the metadata to the mobile device, wherein the metadata is collected from at least one database remote from the mobile device.

45. The apparatus of claim 39, wherein the disclosed metadata includes a number of overall remaining free minutes of a usage contract, a number of remaining free minutes with a particular provider, a number of remaining minutes for use in engagement of a communication, or a combination thereof.

46. The apparatus of claim 39, further comprising a balancer that performs a fiscal transaction in relation to providing the metadata.

47. The apparatus of claim 39, wherein the disclosed metadata includes a usage classification associated with a number or the identity.

48. The apparatus of claim 39, wherein the disclosed metadata includes an amount of communication time that remains associated with the usage of the mobile device.

49. The apparatus of claim 39, wherein the disclosed metadata includes a number of engagements that remain associated with the usage of the mobile device.

50. At least one processor configured for communication regulation, comprising:
a first module for collecting metadata related to usage of a mobile device in relation to an incoming communication, wherein the metadata includes a provider classification that includes at least one of a same provider that is a service provider of a wireless communication device, an associated provider that is different than the service provider for the wireless communication device or a foreign provider that is independent from the service provider of the wireless communication device;
a second module for determining if there should be a disclosure of the metadata based on an identity of a sender of the incoming communication;
a third module that determines whether an identity list should be populated with the identity of the sender if it is determined that the identity of the sender is not on the identity list; and
a fourth module for disclosing that there is no charge for the incoming communication responsive to determining that the metadata should be disclosed and that the provider classification is the same provider or the associated provider, and for disclosing at least one of minutes remaining or a charge rate for the incoming communication responsive to determining that the metadata should be disclosed and that the provider classification is the foreign provider.

51. A processor that is in communication with a non-transitory computer readable storage medium that stores a program product that when executed by the processor causes the processor to perform a process, the process comprising:
causing a computer to collect metadata related to usage of a mobile device in relation to an incoming communication, wherein the metadata includes a provider classification that includes at least one of a same provider that is a service provider of a wireless communication device, an associated provider that is different than the service provider for the wireless communication device or a foreign provider that is independent from the service provider of the wireless communication device;
causing the computer to determine if there should be a disclosure of the metadata based on an identity of a sender of the incoming communication;
causing the processor to determine whether an identity list should be populated with the identity of the sender if it is determined that the identity of the sender is not on the identity list; and
causing the computer to disclose at least a portion of the collected metadata and that there is no charge for the incoming communication, responsive to determining that the metadata should be disclosed and that the provider classification is the same provider or the associated provider, and to disclose at least one of minutes remaining or a charge rate for the incoming communication, responsive to determining that the metadata should be disclosed and that the provider classification is the foreign provider.

52. An apparatus, comprising:

means for collecting metadata related to usage of a mobile device in relation to an incoming communication, wherein the metadata includes a provider classification that includes at least one of a same provider that is a service provider of a wireless communication device, an associated provider that is different than the service provider for the wireless communication device or a foreign provider that is independent from the service provider of the wireless communication device;

means for determining if there should be a disclosure of the metadata based on an identity of a sender of the incoming communication;

means for determining whether an identity list should be populated with the identity of the sender if it is determined that the identity of the sender is not on the identity list; and means for disclosing at least a portion of the collected metadata and that there is no charge for the incoming communication responsive to determining that the metadata should be disclosed and that the provider classification is the same provider or the associated provider, and for disclosing at least one of minutes remaining or a charge rate for the incoming communication responsive to determining that the metadata should be disclosed and that the provider classification is the foreign provider.

\* \* \* \* \*